United States Patent [19]

Hancock

[11] 3,725,861

[45] Apr. 3, 1973

[54] APPARATUS AND METHOD FOR ESTABLISHING EXACT RECORD REORIENTATION AFTER ERROR CONDITION IN A DATA STORAGE SUBSYSTEM

[75] Inventor: Robert J. Hancock, San Jose, Calif.

[73] Assignee: International Business Machines Corporation, Armonk, N.Y.

[22] Filed: Nov. 10, 1971

[21] Appl. No.: 197,459

[52] U.S. Cl. ....................340/146.1 F, 340/174.1 A, 174.1 B

[51] Int. Cl. ....................G11c 29/00

[58] Field of Search ..340/146.1 F, 174.1 A, 174.1 B, 340/174.1 H, 174.1 J, 174.1 K, 172.5

[56] References Cited

UNITED STATES PATENTS

| | | | |
|---|---|---|---|
| 3,192,515 | 6/1965 | Pingry | 340/174.1 J |
| 3,331,053 | 7/1967 | Gindi | 340/174.1 K |
| 3,523,287 | 8/1970 | Morrison et al. | 340/174.1 B |
| 3,577,132 | 6/1971 | Anderson et al. | 340/174.1 A |
| 3,585,619 | 6/1971 | Cogar et al. | 340/174.1 H |
| 3,636,536 | 1/1972 | Norris | 340/174.1 H |
| 3,641,526 | 2/1972 | Bailey et al. | 340/174.1 A |
| 3,641,534 | 2/1972 | Irwin | 340/174.1 A |

*Primary Examiner*—Charles E. Atkinson
*Attorney*—Peter R. Leal et al.

[57] ABSTRACT

Apparatus and a method in a cyclically readable storage subsystem for establishing exact record reorientation on a record, in order to process said record on a read cycle subsequent to the detection of an error condition in the record. Variable length records are recorded on circumferential tracks, said tracks being divided logically into sectors. At the beginning of processing each record, its sector number is stored and a counter having a period of precisely one revolution is started. If an interrupt due to an error condition establishes the interrupt is handled and, when the selected processing transducer is at the saved sector value minus one on a subsequent revolution, a specified time delay T is begun. At time T, a timer creates a first window W1 under which the counter is continuely checked for a predetermined value which the counter should achieve just prior to the beginning of the record. Upon detection of this value, a second timer creating a second window W2 is started and a beginning of record indicator is searched for under this window. Detection of the beginning of record indicator within W2 extablishes the reorientation.

5 Claims, 10 Drawing Figures

*INVENTOR.*

ROBERT J. HANCOCK

*BY Peter R. Leal*

ATTORNEY

APPARATUS AND METHOD FOR ESTABLISHING EXACT RECORD REORIENTATION AFTER ERROR CONDITION IN A DATA STORAGE SUBSYSTEM

BACKGROUND OF THE INVENTION

In modern day computer systems a central processing unit, or CPU, processes instructions and data, most of which, due to main storage limitations within the CPU, are stored in one or more peripheral storage devices external to the CPU. Generally, a CPU is connected to a data channel which, in turn, is connected to the peripheral storage devices by way of a storage control unit. An operation performed at the CPU or channel is said to be performed at the system level, while an operation performed at the peripheral storage device or storage control unit is said to be performed at the subsystem level.

Due to technological advances, a new generation of storage subsystem has incorporated an error correction code (ECC) feature for the automatic correction of certain classes of errors as well as error recovery procedures for other classes of errors. For the situation in which the peripheral device being controlled is a cyclically readable device such as a rotating disk storage drive, information is stored in records on circumferential data tracks. When an error condition is detected in a record, it must be corrected by the error correction feature or by an error recovery procedure. In one instance, correction is done by the ECC in the control unit after the record is read and the error detected. While the correction is being completed, the selected read head and the circumferential data track in which the record was read are, of course, moving relative to each other such that the head becomes geometrically disoriented relative to the next record. That is, if a chain of channel command words (CCW's) is being processed, error processing will take too much time to allow processing the next CCW on the next sequential record on the track. This has been alleviated, in one case, by orienting the selected read head, on a subsequent revolution, at the record in which the error was detected, transmitting to the channel the corrected data from that record, which was previously stored in the control unit, and then continuing processing the CCW chain.

However, the process of reorienting on the record in the subsequent revolution has presented grave problems. It is possible, for example, for the logic circuits associated with the sector (counting, saving, retrieving) to fail without being detected. This would result in reorientation on the wrong record. Reorienting on the wrong record would send improper data to the system or could result in the wrong data being erased or modified. It is also possible for a false beginning of record indicator to be found which would also result in the above problems.

SUMMARY OF THE INVENTION

The present invention avoids the above shortcomings by providing a method of precisely establishing exact record reorientation. This is done in a system employing peripheral storage units wherein data is stored in variable length records on cyclically readable data tracks. One such example of this type of peripheral storage device is a rotating magnetic disk storage drive. Each track in the drive is logically divided into sectors. At the beginning of processing each record, its sector number is stored for the eventuality that reorientation may have to take place. Also, a counter having a period of precisely one revolution is started, for the same eventuality. If an interrupt due to an error condition occurs, the interrupt is handled, and orientation is disturbed. To re-establish orientation, a command is given to position the selected read head at the saved sector value minus one on a subsequent revolution, and a specified time delay T is begun. At time T, a timer creates a first window W1 under which the control unit continuously checks the counter for predetermined value which the counter should achieve just prior to the beginning of the record. Upon the detection of this value, a second timer creates a window W2 and the beginning of the record is searched for under this window. Detection of a beginning of the record indicator within W2 establishes the desired orientation.

Other objects and attendant advantages of this invention will become appreciated as the same becomes better understood by reference to the following detailed description when considered in connection with the accompanying drawing.

Figures 1, 2:
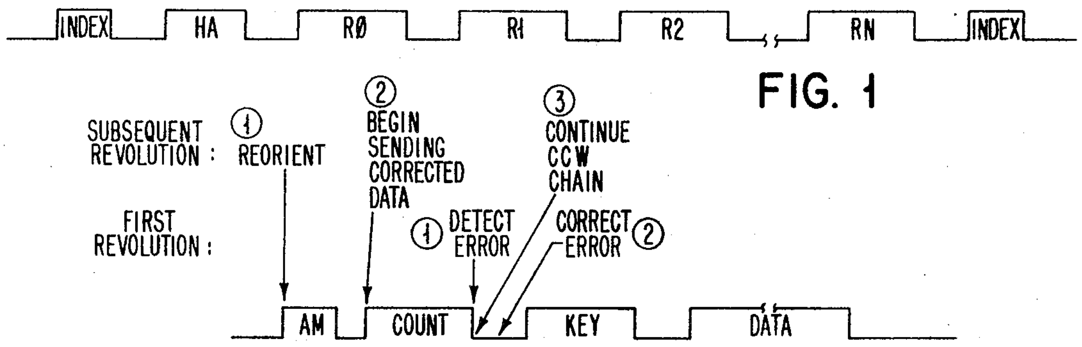
FIG. 1 is a representation in linear fashion of a typical data track on a cyclically readable storage device useful in the invention.
FIG. 2 is a detailed representation of a typical data record in such storage device.

Before beginning a description of the invention, it would first be well for background purposes to discuss information storage generally in one system in which the current invention will find use, it being recognized that the invention will also find use in other types of storage systems. Information is generally stored, in the system under discussion, along circumferential data tracks on disk packs, in records comprising three information fields: a count field, a key field, and a data field. The beginning of a record is indicated for control purposes by an address marker. Each address marker is preceded by a synchronization area to synchronize timing components used for reading. Each track is headed by a home address field for address identification and a track descriptor record to indicate the physical condition (such as defective or defect free) of the track. The beginning of the track for control timing purposes is indicated by a signal indicated as an index point. For further details on the manner in which information is stored in records of this type, the reader is referred to U.S. Pat. No. 3,299,410 to J. R. Evans, assigned in common herewith.

When data errors are encountered in the system of this type, they are generally corrected by an error correction code (ECC) system, if possible, which supplies the displacement, or location, of the error in the information field, and the bit pattern useful in the correction of the error. Such a system is seen in co-pending application Ser. No. 874,234 by H. P. Eastman filed Nov. 5, 1969, now U.S. Pat. No. 3,622,984 and assigned to the assignee of the instant application. One way of applying such error correction is to retry the command if the detected error is in the relatively short home address, track descriptor record, or the count or key fields of any other record. The data in error can temporarily be stored in a buffer area in the storage control unit and corrected there by the ECC system. To then transmit the corrected data to the using system, the command is retried and it is necessary to properly reorient the appropriate transducer on the desired record on the track on a subsequent revolution, as described in the invention herein. When the appropriate transducer is properly oriented on the desired record on the track, the repaired data in the buffer is sent to the channel, the system now being ready to continue processing the next field of the given record or the next sequential record on the track, if this is so indicated by the control of the system at this point. In addition to data correction, the record reorientation technique is also used to reorient if an uncorrectable data error occurs, if a command is issued by the CPU which is too late to maintain orientation (command overrun), or if a data byte is not taken or sent by the CPU in time to maintain orientation (data overrun).

A process for achieving the proper control for retrying the command is seen in copending application Ser. No. 101,079 filed on Dec. 23, 1970 by R. L. Cormier et al., now U.S. Pat. No. 3,688,274 and assigned in common herewith. It will be recognized by those of ordinary skill in the art that the above error correction procedure can be modified and changed according to the needs of the particular system within which the invention is embodied, without departing from the spirit and the scope of the invention.

Further, the data track in a system within which the invention finds use may be logically divided into a number of sectors. The data records may then be recorded in such a manner that the particular sector number of a track nearest the beginning of the record can be determined and saved, or frozen. The sector number is useful for several purposes one of which is the reorientation procedure of the instant invention. Means for recording and reading records of the type under discussion by sector numbers can be seen in copending application, Ser. No. 875,137 filed on Nov. 10, 1969 by A. J. Capozzi, now U.S. Pat. No. 3,629,860, which is assigned to the assignee of the instant application. The operation informing the subsystem that the appropriate transducer has been positioned over the appropriate sector will hereafter be referred to as set sector.

Peripheral storage devices such as the type used for data storage herein are typically controlled by storage control units which interpret commands from the system and provide the necessary control to carry out the commands for data from the peripheral storage devices. Control units are well known and examples of them can be seen in U.S. Pat. No. 3,544,966 to J. J. Harmon and in copending application Ser. No. 888,482 to R. C. Day, filed Dec. 29, 1969, now U.S. Pat. No. 3,623,022 both of which are assigned in common herewith. The instant invention can have application to a microprogrammed control unit subsystem with a read only storage such as that in the Harmon patent, or it can have application to a microprogrammed storage control unit subsystem having a writeable control storage unit such as a monolithic integrated circuit control storage control, an example of control operation of which is seen in the application of Day, cited above.

With the above as background information, the invention will now be described.

STRUCTURE AND METHOD

Referring to FIG. 1, there is seen in linear fashion a typical layout of the data track from index point to index point. It will be appreciated that for the situation in which the peripheral storage device is a rotating disk storage drive, that the index point at either end of FIG. 1 is one and the same and that the track is in fact circumferential. Home Address contains the address of the track while Record 0 is the track descriptor record. Records R1 through RN are records in which are usually stored user information.

Referring to FIG. 2 there is seen an exploded view of a typical data record such as R1 of FIG. 1. Also shown in FIG. 2 is a dilineation of the major steps of the reorientation process on a revolution basis. As seen in FIG. 2, each data record comprises count, key, and data information fields as well as a beginning of record indicator hereinafter referred to as an address marker (AM). The address marker may be, for example, three bytes of no transitions on the data track, which are detected by suitable detection circuitry and used to signal the beginning of the record. On the first revolution it is assumed that the address marker has been detected for initial record processing and a count field has been read. If an error is detected, for example at the end of a count field, the error is corrected or the appropriate error recovery procedure begun in the area following the count field. Since this disrupts orientation and timing to continue processing the key and/or data portions of the record, or processing the next record, then reorientation is begun after the error condition is processed and reorientation is completed on the next or subsequent revolution when the transducer is at the beginning of this record. At that point the subsystem can begin sending the correct data if the error condition was one correctable by an error correction code procedure, and at the end of the count field the transducer would be appropriately positioned to continue the chain of channel command words.

Figure 3:
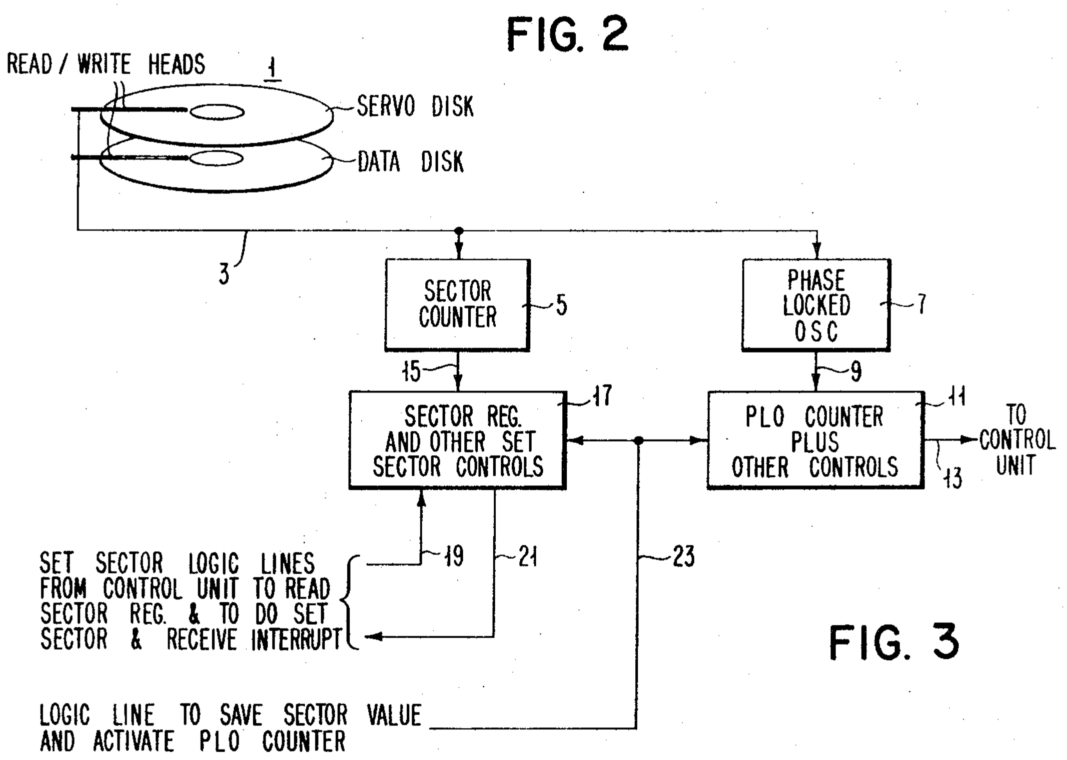
FIG. 3 is a block diagram of apparatus useful in our invention.

With the background information of FIG. 2 showing how reorientation fits into the general scheme of information processing in an exemplary subsystem, attention is now invited to FIG. 3 which shows apparatus useful in the implementation of our invention.

In FIG. 3, the disk drive is seen generally at 1 and is shown to comprise a servo disk and a data disk although in practice there may be several data disks. The read/write heads are connected via line 3 to sector counter 5 and phase locked oscillator 7.

Sector counter 5 is connected via line 15 to a sector register and other set sector logic seen at 17. The logic 17 has input line 19 from the control unit and output line 21 to the control unit. As mentioned previously, in the set sector concept, the disk is logically divided into a number of sectors and by loading a register with one of the sector values a signal is generated when the read/write head is over the sector designated by the register. This logic apparatus is seen in detail in the above cited application of Capozzi. Logic line 23 is connected from the control unit to the set sector register and logic and, when activated, enables the saving of the value of the sector over which the read/write head is located when the logic line is activated. This can be done merely by enabling a gate which gates the contents of the sector register over bus 21 to a suitable storage area in the control unit at which it is saved until needed. Alternatively, it could be stored in the drive.

Phase locked oscillator (PLO) 7 is an oscillator arrangement which is driven by signals from the disk drive and produced an output whose frequency varies with variations in disk speed. Such an oscillator and its relationship to the disk drive 1 is seen in detail in U.S. Pat. No. 3,577,132 and copending application Ser. No.'s 771,205 filed Oct. 28, 1968 by P. C. Lang et al. and 889,442 filed Dec. 31, 1969 by A. LaPine et al., now U.S. Pat. No. 3,614,635. The patent and the applications are assigned in common herewith.

Phase locked oscillator 7 is connected via line 11 to a PLO counter and controls. The PLO counter can be any well known binary counter with appropriate and well known incrementation control. Bus 13 is connected for transmitting the current binary value of the counter to the control unit. The counter is arranged such that its period is exactly one disk revolution; i.e., the counter counts up and automatically returns to 0 after reaching a count equal to one disk revolution. For example, if track capacity were 13,440 bytes, the counter could count bytes and return to zero upon counting 13,440. Or the count could be proportional to bytes. In operation, the count runs continuously until the logic line is activated at the beginning of a record, the logic line resetting the counter and starting counting from 0.

Figure 5:
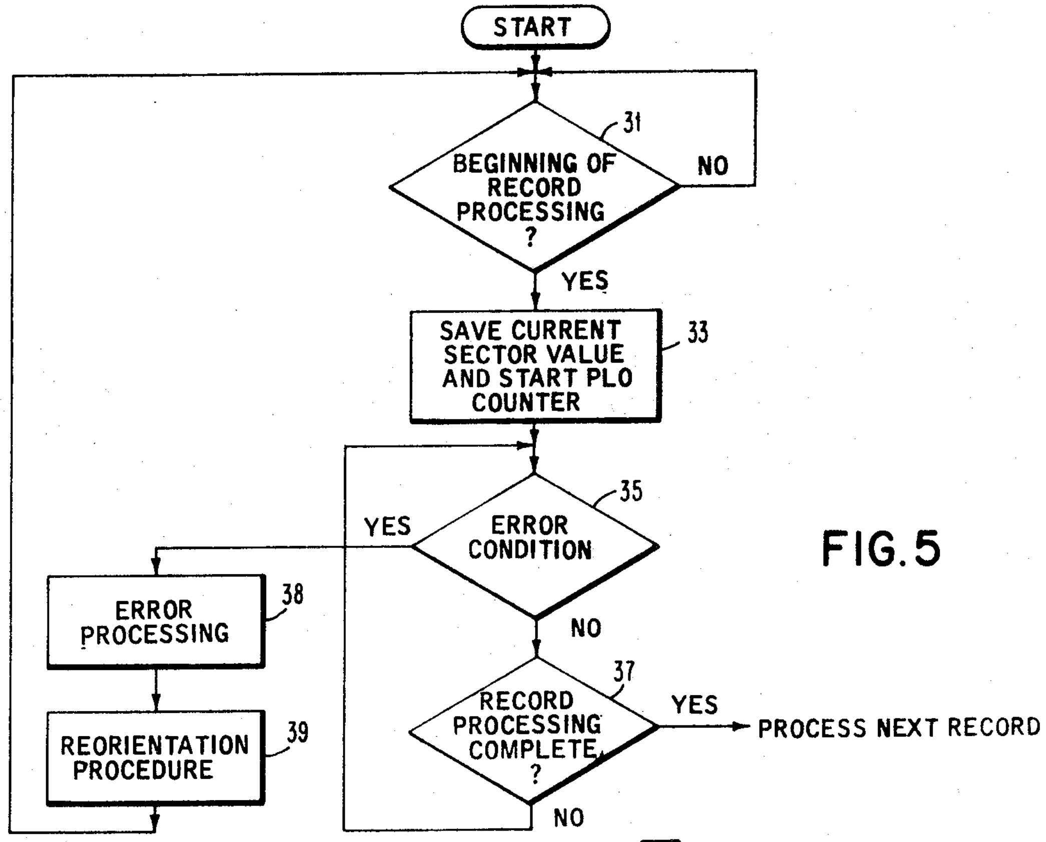
FIG. 5 is a general block diagram of the method of reorientation of our invention.

Referring to FIG. 5, there is seen a general method of operation in which the reorientation method finds use. A test is made as at 31 to determine the beginning of record processing during a normal record processing operation. This would occur, for example, by the detection of the address mark seen in FIG. 2. When the beginning of record processing is detected, the current sector value is saved and the PLO counter is initiated both by activation of logic line 23 of FIG. 3. During processing a check for completion of record processing is made at 35 and 37, respectively. If no errors occurs and if the record processing is complete than all is well, the subsystem remains oriented and the next record is processed essentially beginning again at the start block in FIG. 5. If, on the other hand, an error condition is detected at 35, then the error is processed as indicated at 38 and the reorientation procedure takes place as seen broadly at 39.

Figure 4:
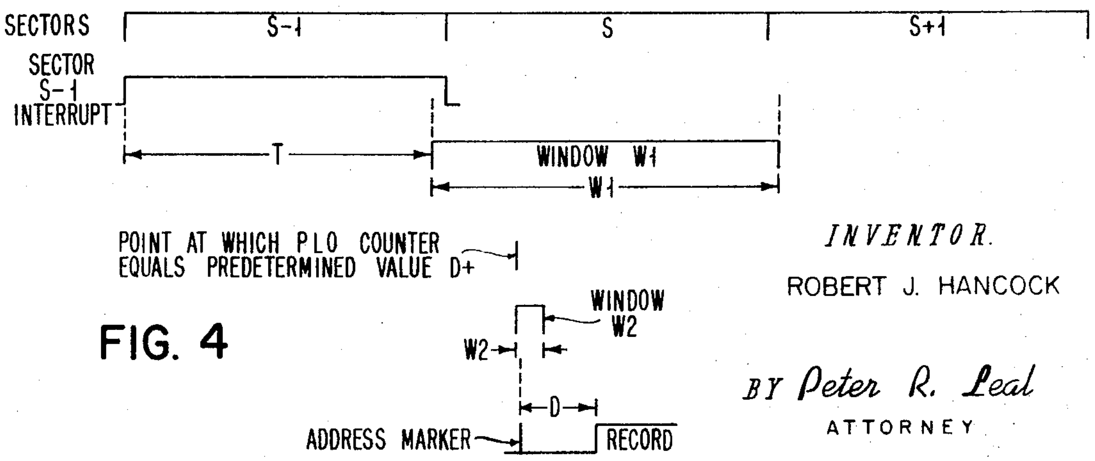
FIG. 4 is a graphical representation of various stages of the reorientation procedure of the invention.
Figure 7:
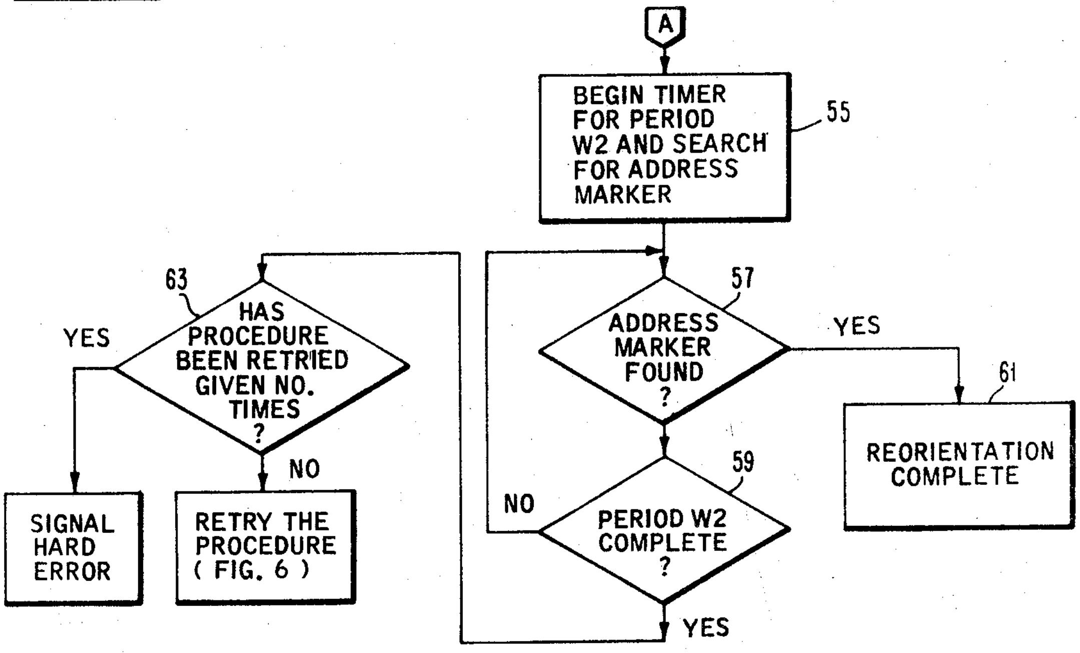
FIG. 7 is a continuation of the block diagram of FIG. 6.
Figure 6:
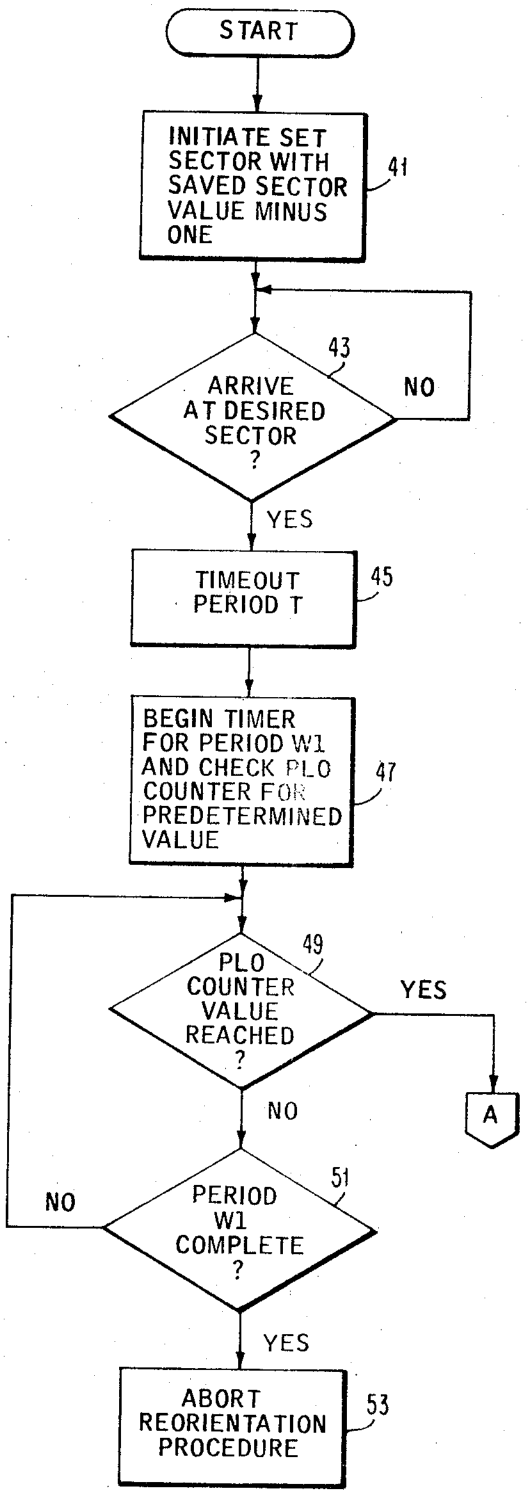
FIG. 6 is a detailed block diagram of the method of the reorientation procedure of our invention.

The reorientation can be seen in detail relative to FIGS. 6 and 7 taken in conjunction with FIG. 4. FIGS. 6 and 7 are a detailed method explanation of the reorientation procedure 39 of FIG. 5. Referring to FIG. 4 there is seen graphically a representation of track sectors for a given record. S is the sector under which the desired record begins while sector (S−1) is the sector therebefore and S+1 is the sector thereafter.

Referring to FIG. 3, it will be recalled that each time a record is processed the logic line 23 is activated which causes the current disk sector number to be frozen or stored in register 17 and also concurrently causes the PLO counter to begin counting from zero. After the error condition is processed as at 38 in FIG. 5 the reorientation procedure is begun. It will be recalled from FIG. 2, that at this point the read head is traversing the portion of the track after the information field relative to which the error was detected and processed. Generally, error processing will take more time than there is available in a gap.

Now, as seen at 41 of FIG. 6, the control unit initiates a set sector operation with save sector value minus one. It will be appreciated that any appropriate position other than S−1 may be used without departing from the spirit and scope of the invention. This will cause the set sector apparatus as described in the above cited application of Capozzi to compare sectors on the track with the desired sector value i.e., the saved or frozen sector value minus one). When the read head detects the leading edge of the desired sector, S−1, the microprogram is interrupted as indicated at the decision block 43 of FIG. 6. Care must be taken to insure that only the leading edge of this interrupt is detected since the effectiveness of timing which follows is compromised if some point other than the leading edge is used as a reference. This can be seen with reference to FIG. 4 wherein the leading edge of sector S−1 begins the timeout for time delay T.

Once the leading edge is detected then, as indicated at 45 of FIG. 6, the microprogram times out a specified time T. The parameter T is a function of the size of the sector, the period W1 and the minimum distance between records. The period W1 includes the theoretical area in which the address marker may be located plus those inaccuracies which affect the definition of the theoretical area. These inaccuracies include:

1. Drive inaccuracies in maintaining a real time relationship between the sector count and the data head.
2. Control unit inaccuracies in reading the PLO counter.
3. Drive inaccuracies in saving the sector value in a register.
4. Control unit inaccuracies in starting the PLO counter.
5. Control unit inaccuracies in orienting on the leading edge of sector S−1
6. Control unit inaccuracies in maintaining real time track positioning while timing time T.
7. Control unit inaccuracies in maintaining real time track positioning while timing W1 and initiating AM search.

At the end of period T a second timer of period W1 is started as seen at 47 of FIG. 6 and also seen graphically at FIG. 4. This timer creates a window W1 under which the microprogram continuously checks the PLO counter for a predetermined value. Since the counter started at 0 at the beginning of the record, the counter should return to 0 each time the beginning of the record is passed. The reorientation will ultimately search for the address marker associated with the record in order to establish exact reorientation at the beginning of the record. The address marker, as mentioned previously with respect to FIG. 2, is physically located a fixed distance D from the beginning of the record. In one system in which the invention finds use, the Address Marker is located 16 bytes from the beginning of the record. Thus D is 16 bytes. The value D+ is 20 bytes. This allows for the one byte uncertainty in starting the PLO counter initially and also allows sufficient time for the AM detection circuitry to be sequenced on. Because of this, the microprogram checks the PLO counter not for zero but for a value D+ slightly more than D before zero, namely the count at which the counter arrives when the read head is slightly in front of the address marker. This is indicated at 49 and 51 of FIG. 6. Each time the counter is checked, if it is determined that it has not reached this value (D+) then the timer is checked and if the period W1 is not completed, the counter is checked again. If the period W1 is completed before the counter reaches the value D+ then the procedure is aborted since under these conditions the reorientation accuracy cannot be guaranteed inasmuch as an error has occurred in either the set sector function or the PLO counter.

If the PLO counter does reach the predetermined value, as indicated from the yes decision of block 49 of FIG. 6, then the microprogram starts a new timer with a period of W2 as seen at 55 of FIG. 7 and also in FIG. 4. This timer essentially creates a second window of high resolution under which detection circuitry in the file control unit, for example, searches for the address marker. The length of window W2 covers time required to detect the address marker. The exact length of W1 and W2 include any timing inaccuracies. Once the address marker is found within window W2, the reorientation procedure is complete as seen at 61. On the other hand, if the W2 period completes with no address marker found as seen from the yes output of block 59 in FIG. 7, then the reorientation procedure can be retried a predetermined number of times. A counter, not shown, can be set up to keep track of the number of times reorientation has been tried. This counter can be tested as at 63 for each time the procedure is tried. If the procedure has been tried a set or predetermined number of times then the error is assumed to be permanent and a hard error is signaled.

It is required that the period W1 be of such length as to contain only one record (i.e., only one address marker). If the period W1 is such as to contain two or more address markers, then if the PLO counter or the sector counter fails, the wrong address marker (and consequently the wrong record) will be found. If the period W1 is such as to contain only one address marker, then either the correct address marker will be found or, in case of PLO counter or sector counter failure, no address marker will be found and the reorientation procedure will fail safely by aborting. This can be seen with reference FIG. 4. Summarizing, window W1, which includes the above tolerances, should be such as to contain only one address marker. The time T in the Figure can be calculated according to system parameters, T being the time elapsed from the time of the sector S–1 interrupt until the beginning of window W1, defined as above. Then the point within the window at which the PLO counter equals the predetermined value of D+ sets up the final window W2 during which the address marker is searched for.

By way of example, it was found in one system within which the invention can find use, that the sector length was too large to enable W1 to contain only one address marker. In the system under discussion, track capacity was 13,400 bytes and minimum distance between address markers was 134 bytes. Sector lengths were alternately 104 and 106 bytes, respectively for an average of 105 bytes per sector. Therefore, there were 128 sectors per track. It was found that with sectors of 128 bytes, the period W1, including the above tolerances, would be more than 134 bytes and would therefore contain more than one address marker if minimum length records were recorded on the track. One way to overcome this problem with the sector lengths stated was to simulate shorter sector lengths. An alternate embodiment showing this feature is seen in FIG. 4A.

Figures 4A, 4B, 5A:
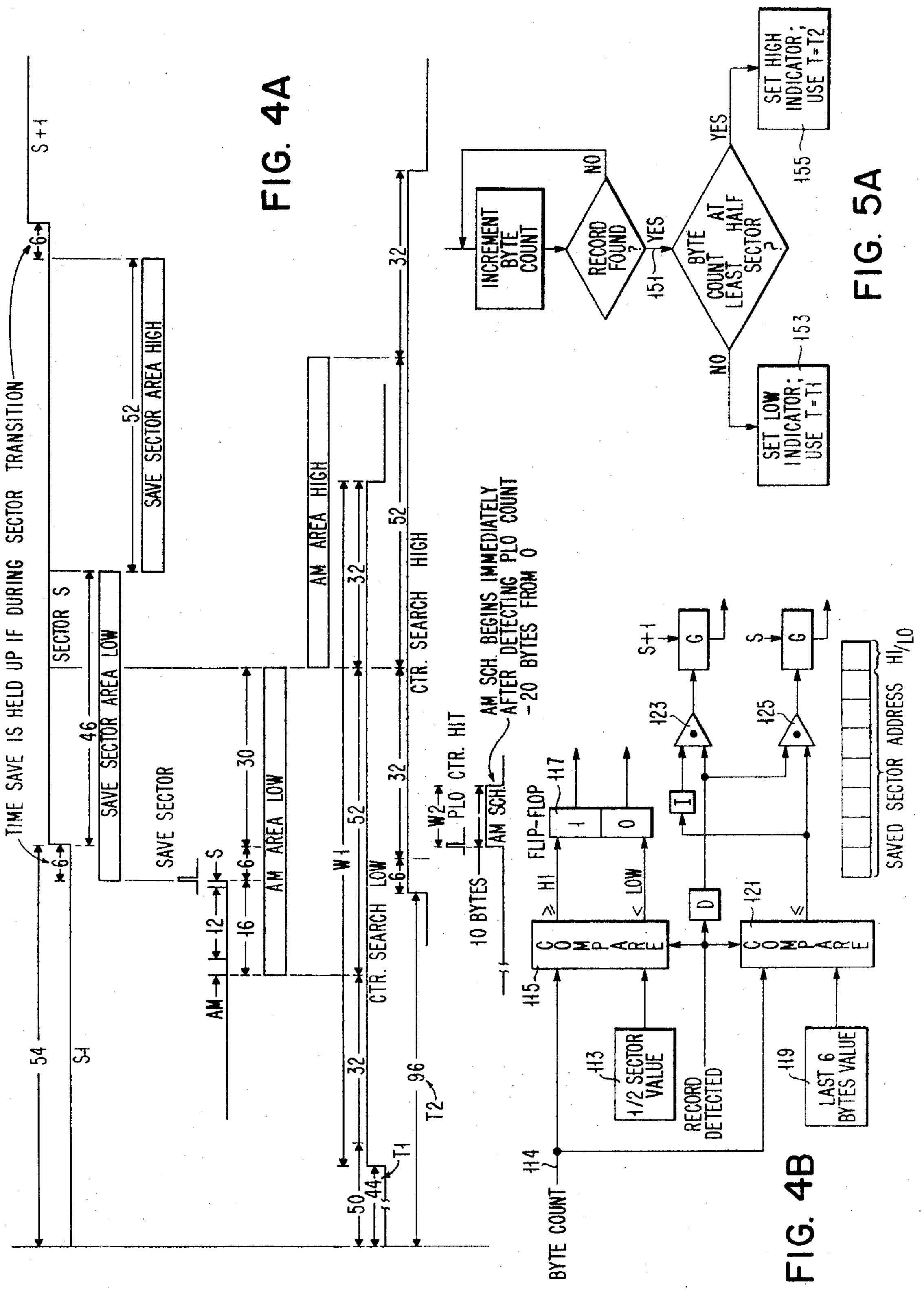
FIG. 4A is a graphic representation of the time relationship between Save Sector Area Low, Save Sector Area High, AM Area Low, AM Area High, Counter Search Low and Counter Search High.
FIG. 4B shows an apparatus for generating indications as to whether the Save Sector Area is high or low.
FIG. 5A is a detailed block diagram of the method for determining the length of time and period T for use in the method of FIG. 6.

In FIG. 4A is seen sectors S–1 and S, and a portion of sector S+1. In this embodiment, as mentioned above, there are 128 sectors of an average length of 105 bytes. However, by simulation it is made to appear as if there were 256 sectors of half that length. This is done by logically dividing each sector into a low area and a high area. It will be recalled that when a record is initially detected for processing, the sector number is saved. If the area within which this record is initially detected is the lower half of the sector, an indicator denoting that fact is also saved. Likewise, if the record is detected in the upper half of the record and indicator of that half is likewise saved. This can be seen by reading FIGS. 4A and 4B together. It is assumed for the purpose of this embodiment that all sectors are 104 bytes in length, although in actuality they alternate between 104 and 106 bytes. The small error introduced by this assumption is taken care of tolerance associated with W1, to be explained subsequently. As seen in FIG. 4A, there is a Save Sector Area Low and a Save Sector Area High, denoting whether or not the record was found in the lower or higher part of the sector, respectively. The save sector area within which the record was initially found will, of course, be the area within which the record will subsequently be found for reorientation. In order to take care of the situation in which the record is initially detected in close proximity to the transition between sectors, a convention was established that any record detected during the last six bytes of a given sector will be treated as having been detected in the low area of the subsequent sector, as seen in FIG. 4A. This is a design choice and is not essential to the substance of the invention. Apparatus for performing this high/low indication is well known in the art and can be designed by the above teaching. However, a brief description of one type of apparatus to perform this can be seen with respect to FIG. 4B. The byte count from the beginning of each sector is connected via bus 114 to comparison means 115 and 121. Apparatus for providing a number indicating one half the sector value in bytes, such as storage apparatus 113, is also connected to compare means 115. Similar storage means for providing the byte value for the final six bytes of a sector are connected to comparison means 121. When a record is detected, comparison means 115 and 121 are activated. If the number of bytes is greater than or equal to the one half sector value then the 1 side of flip flop 117 is triggered indicating that the record was found in the high portion of the sector. If the record was detected in the low portion of the sector the 0 side of flip flop 117 would be triggered. It will be recalled that there are 128 sectors for this embodiment. The binary representation of the Save Sector address therefore only takes 7 bits and the eighth bit of an 8 bit register can be used for the high/low indicator as seen in FIG. 4B. If comparison means 121 indicates that the byte count within the sector at which the record is initially detected is less than the last six bytes value, the sector value S will be gated to the indicated seven bits in the Save Sector register and the contents of flip flop 117 can be used as the high/low indicator. If comparator 121 shows that the record was detected within the last six bytes then the sector value S+1 is gated to the register and the inverse of flip flop 117 (i.e., low) can be used as the high/low indicator.

Referring back to FIG. 4A, the areas indicated AM Area Low and AM Area High indicate the area within which the address marker will be found on a subsequent revolution for a record initially detected in the Save Sector Area Low or Save Sector High, respectively. As can be seen, this would by 52 bytes long. However, due to the above tolerances, 32 bytes have been added to either side, plus a leading six bytes for the transition factor so that W1 is 122 bytes in length. In order for this to be so, the value of T for the situation in which the record was initially detected in the low section of the sector is *T*1=44 bytes. At that point the window W1 is opened and the PLO counter is searched. When a hit is encountered in the PLO counter search, the window W2 is opened and the address mark is searched for the next 10 bytes. If the address marker is detected, then reorientation has taken place. If the address marker is not detected within this W2 period, then an error has occurred and the procedure aborts as mentioned previously. If the record was initially detected in the high portion of the sector, then the value of T, namely T2, is 96 bytes as shown and the same search procedure is undertaken.

A broad outline of this procedure for simulating a smaller sector is seen in FIG. 5A. The byte count is incremented from the beginning of the sector until such time as a record is found as at 151. At that point the byte count is tested by apparatus such as that in FIG. 4B. The high/low indicator is set as indicated at 153, 155 in FIG. 5A, which will result in the use of T1 or T2, respectively for the timer T in FIG. 6. It will be readily appreciated by those of ordinary skill in the art that other variations of this method can be employed without departing from the spirit and the scope of the invention. For example, one such variation would be to eliminate the use of W1 and check the PLO counter at the time of the interrupt. The counter would be checked to determine whether its count was within a range such that a hit would be obtained during W1 had W1 been used; that is, for a record originally detected in the Save Sector Low area, whether its count was within a range equivalent in bytes to between [13,440−$T_1$] and [13,440−($T_1$+$W_1$)], or [13,440−44] and [13,440−(44+122)]. Then merely count the number of bytes (from the interrupt) necessary to bring the PLO counter to 13,420 bytes and use window W2 during which to search for the address marker for the usual 10 byte period.

Reorientation involving Home Address and Record 0 of FIG. 1 is handled slightly differently. These records for the subsystem under discussion do not have an address marker. Orientation is accomplished by timing from index point to Home Address. Since Home Address and Record 0 are at a fixed location on the track from index, and since the sector value associated with them is fixed, it is not necessary to use window W1 during this orientation. The microprogram merely waits for index point when reorienting during a subsequent revolution, and then checks the PLO counter. The counter value should be greater than some fixed value if no errors have occurred for reorientation. In the above embodiment, a count of 223 bytes is checked for.

A modification of this scheme is possible for the case in which counter 7 cannot be kept in exact sync with the disk; i.e., the counter will not recycle once per disk revolution. This would be the case if the phase lock oscillator of the type described were not used, or if the number of bytes per track were not fixed. The modification is as follows. Whenever the index point is reached, the contents of the PLO counter is saved in a register and the PLO counter starts counting from 0. The operation of the logic line remains the same. The same procedure as described above is used with the addition that the PLO counter value which the microprogram checks for under window W1 is calculated by using the value of the contents of the PLO counter saved in the register.

While the invention has been particularly shown and described with reference to the preferred embodiment thereof, it will be understood by those skilled in the art that the foregoing and other changes in form and detail may be made therein without departing from the spirit and scope of the invention.

What is claimed is:

1. In a data storage subsystem wherein data are stored upon media which are in moving relationship to transducers, data being recorded as records on cyclically readable data tracks logically divided into sectors, said records having a beginning of record indicator, the method of reorienting a selected transducer relative to a record after record reorientation is broken, comprising the steps of:

1. Initially detecting a record within a sector;
2. Monitoring, subsequent to loss of orientation of said transducer relative to said record, the sector position of said selected transducer along said track on a revolution subsequent to that within which said record was initially detected;
3. Detecting a signal indicating that said transducer is a predetermined distance from said sector;
4. Detecting, after said detecting of said signal, that said transducer is within a predetermined distance from the expected beginning of said record; and 5. Detecting said beginning of record indicator within said predetermined distance.

2. In a data storage subsystem wherein data are stored upon media which are in moving relationship to transducers, said data being recorded as records on cyclically readable data tracks logically divided into sectors, said records having a beginning of record indicator, the method of reorienting a selected transducer relative to one of said records after record reorientation is broken, comprising the steps of:

1. Initiating a counter of period substantially equal to one cycle of said cyclically readable data tracks, in response to initial detection of said record within a sector on one of said tracks;
2. Monitoring, subsequent to loss of orientation of said transducer relative to said record, the sector position of said transducer along said one of said tracks;
3. Detecting a signal indicating that said transducer is at a predetermined distance from said sector;
4. Detecting a count in said counter indicating that said transducer is within a predetermined distance from the expected beginning of said record; and
5. Detecting the beginning of record indicator of said record within said predetermined distance.

3. In a data storage subsystem wherein data are stored upon media which are in moving relationship to transducers, said data being written as records on cyclically readable data tracks logically divided into sectors, said records each having a beginning of record indicator, the method of reorienting a selected transducer relative to a record after record reorientation is broken, comprising the steps of:

1. Storing the number of the track sector on the one of said data tracks within which a record is initially detected by a transducer for processing, and initiating a counter having a period substantially equal to one cycle of said cyclically readable data tracks, in response to initial detection of said record;
2. Monitoring, subsequent to loss of orientation of said transducer relative to said record, the sector position of said transducer along said one of said tracks;
3. Detecting the signal indicating that said transducer is within a predetermined distance from said stored sector;
4. Initiating a first counting mechanism to establish a first time delay;
5. Detecting the end of said first time delay and establishing in response thereto a first predetermined time period for monitoring said counter;
6. Monitoring said counter during said first predetermined time period to detect a predetermined count;
7. Establishing, in response to the detection of said predetermined count, a second predetermined time period;
8. Detecting the beginning of record indicator of said record within said second predetermined time period.

4. In a data storage subsystem wherein data are stored upon media which are in moving relationship to transducers, said data being written as records on cyclically readable data tracks logically divided into sectors, said records having a beginning of record indicator, the method of reorienting a selected transducer relative to a record after record reorientation is broken, comprising the steps of:

1. Storing the number of the track sector within which a record is initially detected by a transducer for processing, and storing an indication of whether said record was detected in the upper or lower portion of said sector, and also initiating a counter having a period substantially equal to one cycle of said cyclically readable data tracks, in response to initial detection of said record;
2. Monitoring subsequent to loss of orientation of said transducer relative to said record, the sector position of said transducer along said track;
3. Detecting a signal indicating that said transducer is within a predetermined distance from said sector;
4. Initiating a first counting mechanism to establish one of two time delays, the choice of said one of said two time delays depending upon whether said record was detected in the upper or lower portion of said sector;
5. Detecting the end of said one of said two time delays and establishing in response thereto a first predetermined time for monitoring said counter;
6. Monitoring said counter during said first predetermined time period to detect a predetermined count;
7. Establishing, in response to the detection of said predetermined count, a second predetermined time period;
8. Detecting the beginning of record indicator of said record within said second predetermined time period.

5. In a data storage subsystem wherein data are stored upon media which are in moving relationship to transducers, said data being recorded as records on cyclically readable data paths logically divided into sectors, said records having a beginning of record indicator, the method of reorienting a selected transducer relative to a record after record reorientation is broken; comprising the steps of:

1. Detecting the beginning of one of said records;
2. Starting, in response to said detecting, a counting mechanism having a period substantially equal to one cycle of said cyclically readable data paths and concurrently storing the number of the sector on the one of said tracks within which the beginning of said record was initially detected;
3. Electronically processing said records;
4. Detecting an interrupt indicating an error condition;
5. Electronically performing an error recovery procedure in response to said interrupt;
6. Monitoring the sector position of selected transducer along said one of said tracks;
7. Detecting a signal indicating that the selected transducer is at a predetermined distance from said sector;
8. Initiating a first timing mechanism to establish a first predetermined time delay;
9. Establishing, in response to the detection of the end of said first predetermined time delay, a first predetermined time period for monitoring said counter;

10. Monitoring said counter during said first predetermined time period to detect a predetermined count;
11. Establishing, in response to the detection of said predetermined count, a second predetermined time period;

12. Monitoring said cyclically readable data path during said second predetermined time period to detect the occurrence of said beginning of record indicator.

* * * * *